United States Patent [19]

Shaw, Jr.

[11] 3,871,773
[45] Mar. 18, 1975

[54] METHOD OF AND APPARATUS FOR DETECTING DEFECTS AND THE POSITION THEREOF IN TRANSPARENT ARTICLES

[75] Inventor: Hugh E. Shaw, Jr., New Kensington, Pa.

[73] Assignee: PPG Industries Inc., Pittsburgh, Pa.

[22] Filed: Apr. 24, 1973

[21] Appl. No.: 354,030

[52] U.S. Cl............. 356/200, 250/216, 250/237 G, 350/295, 356/239
[51] Int. Cl...................................... G01n 21/16
[58] Field of Search ............... 350/6; 356/200, 239; 250/227, 237 G

[56] References Cited
UNITED STATES PATENTS

| | | | |
|---|---|---|---|
| 2,883,649 | 4/1959 | King, Jr. | 250/227 |
| 3,353,022 | 11/1967 | Schwartz | 350/6 |
| 3,445,672 | 5/1969 | Marks | 356/237 |
| 3,609,380 | 9/1971 | Shaw, Jr. | 356/239 |
| 3,743,431 | 7/1973 | Cushing et al. | 356/239 |

Primary Examiner—Vincent P. McGraw
Attorney, Agent, or Firm—Donald Carl Lepiane

[57] ABSTRACT

A method of and apparatus for detecting defects such as point-type and B-type defects in a transparent article, e.g. a glass ribbon, and determining position of the defect as a function of position in the article are disclosed. A positioning beam and a scanning beam are transmitted onto the surface of an oscillating directional mirror. The two beams are reflected from the oscillating directional mirror onto a concave reflecting surface. As the directional mirror oscillates, the two beams are synchronously displaced across the reflecting surface. The scanning beam is transmitted from the reflecting surface through the article along a scan path to scan contiguous lateral portions of the glass ribbon while the positioning beam is transmitted from the reflecting surface onto position sensing facilities. Facilities are provided for sensing intensity changes of the scanning beam which are caused by defects along the scan path. The position sensing facilities are actuated by the positioning beam to indicate the position of the scanning beam along the scan path to determine the position of the defects in the article.

15 Claims, 11 Drawing Figures

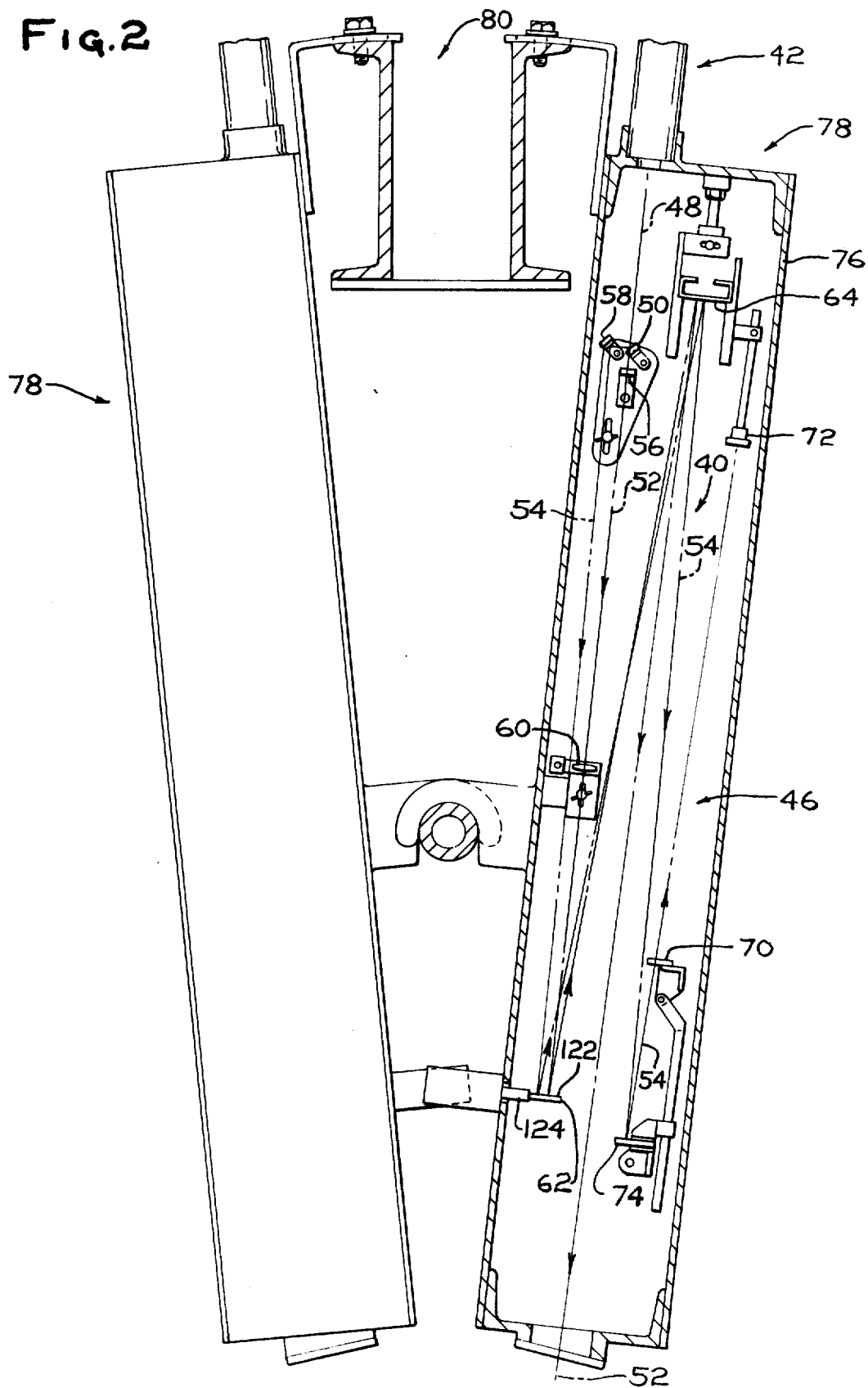

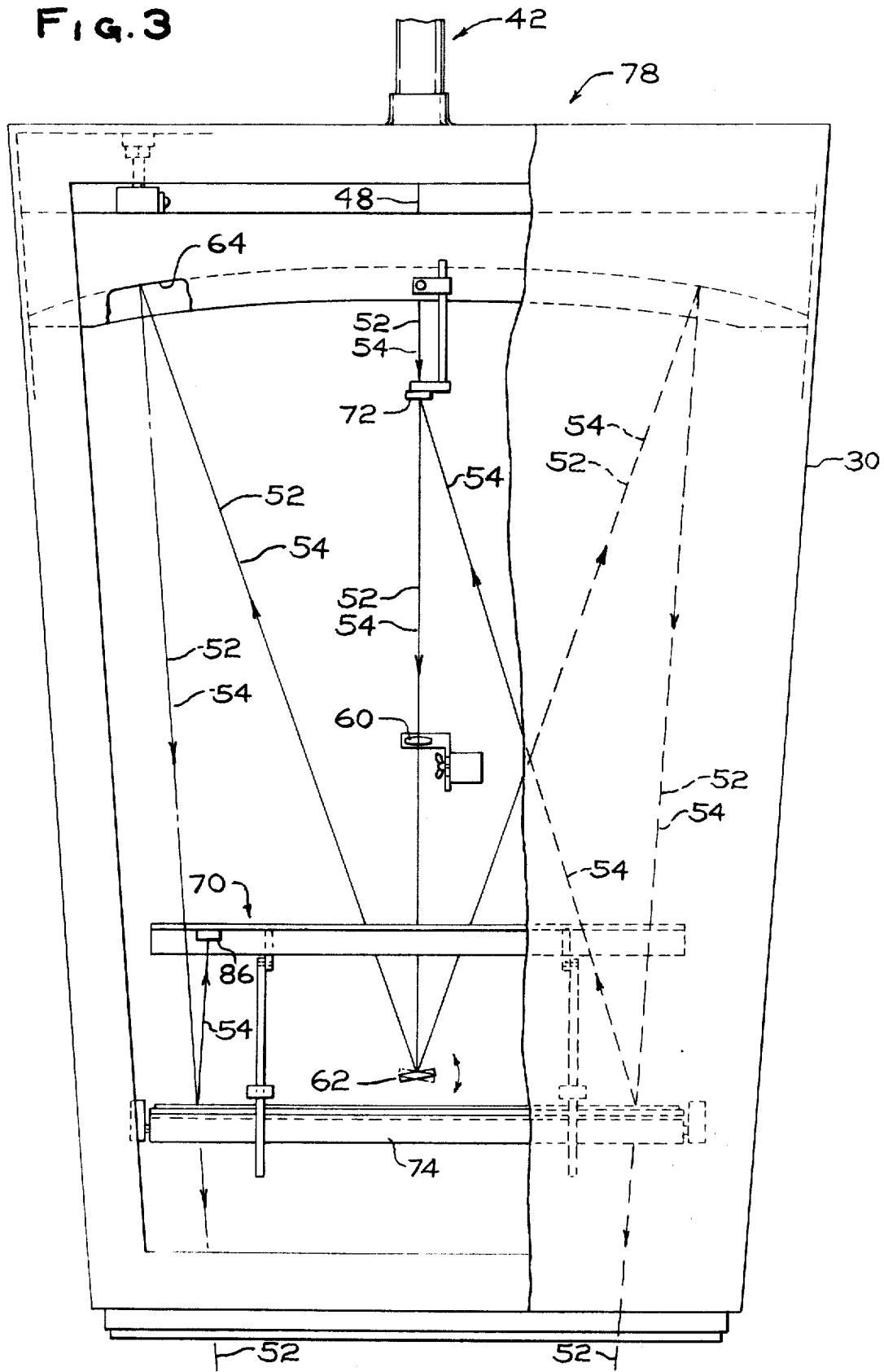

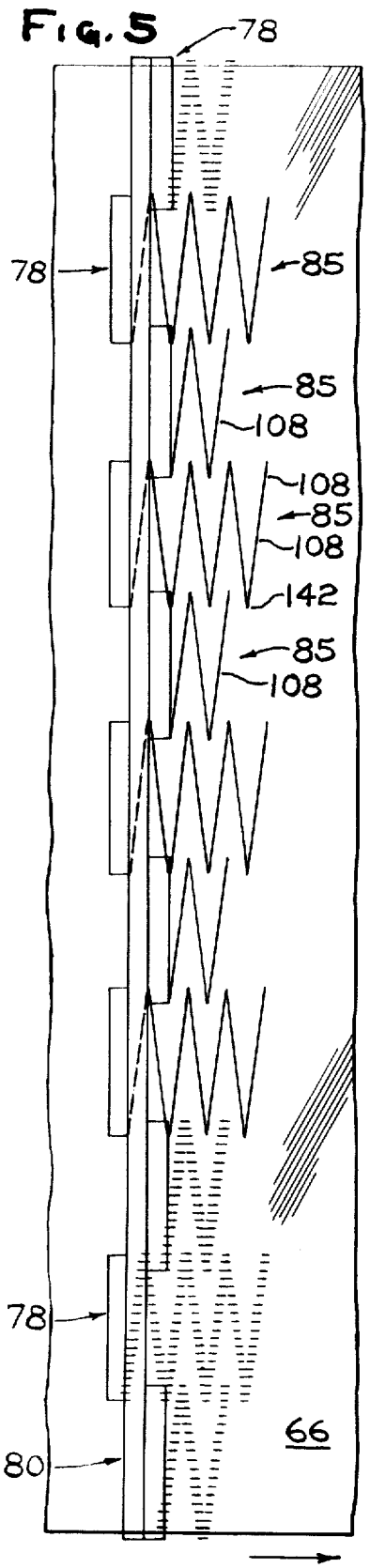
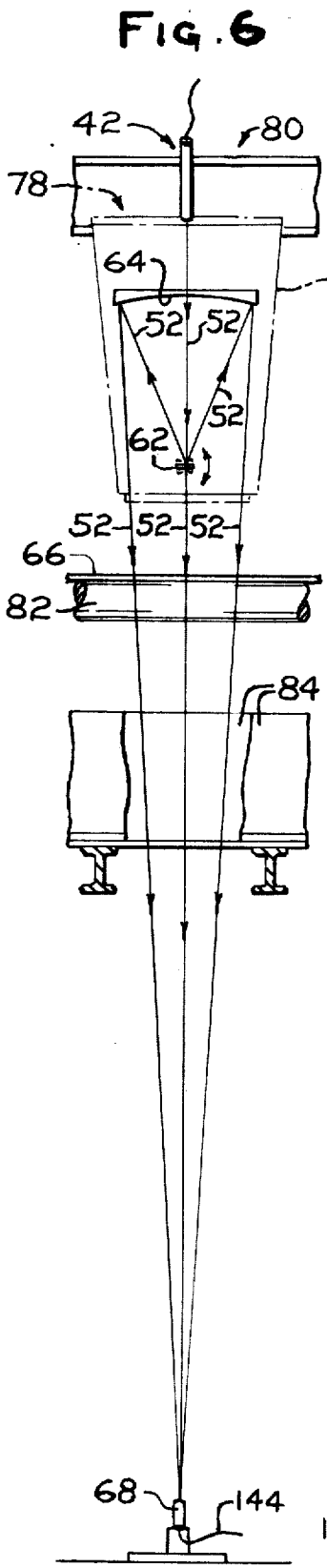
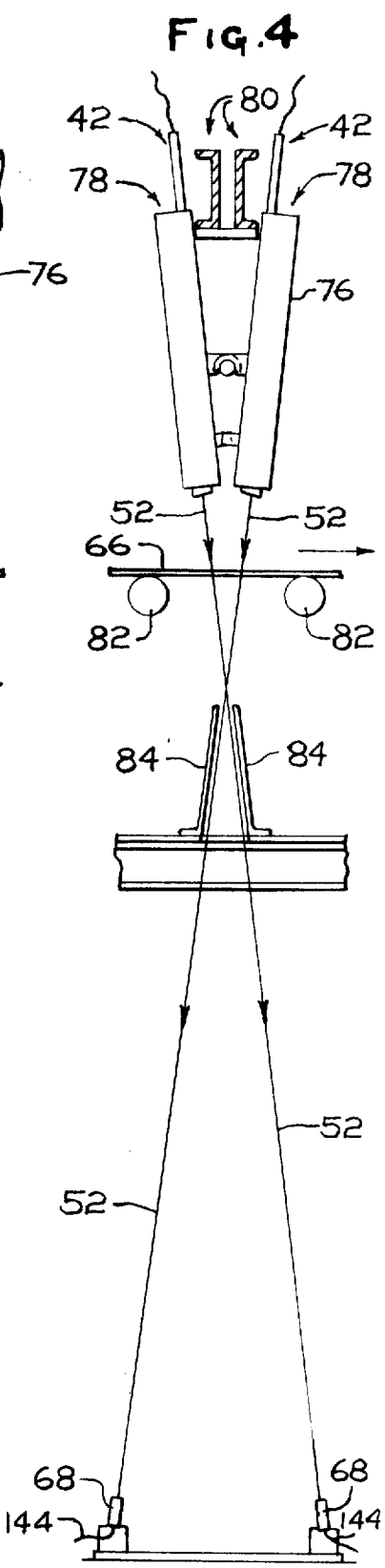

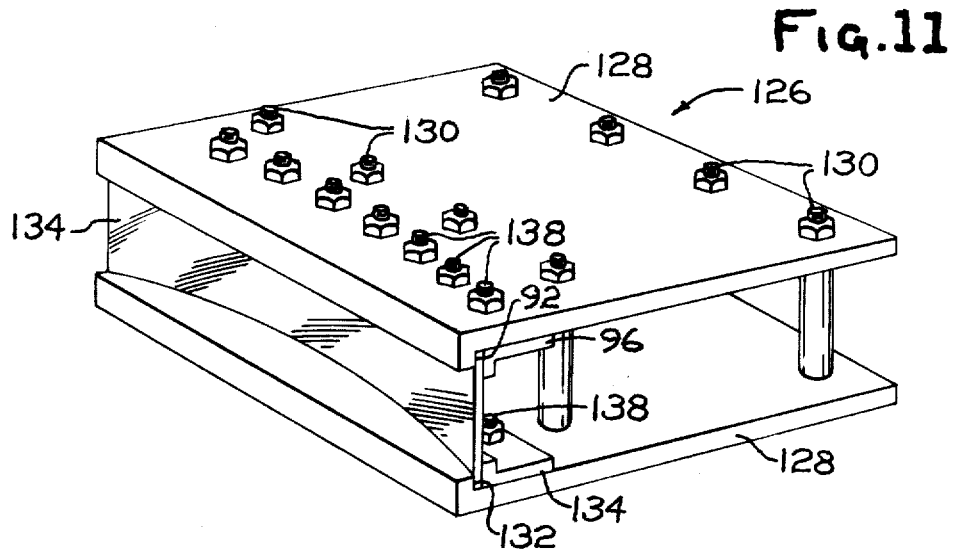
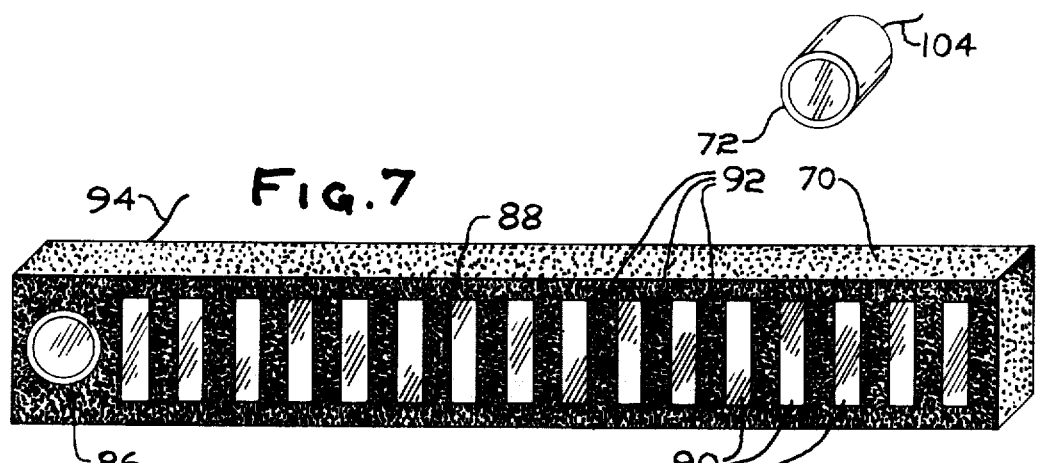
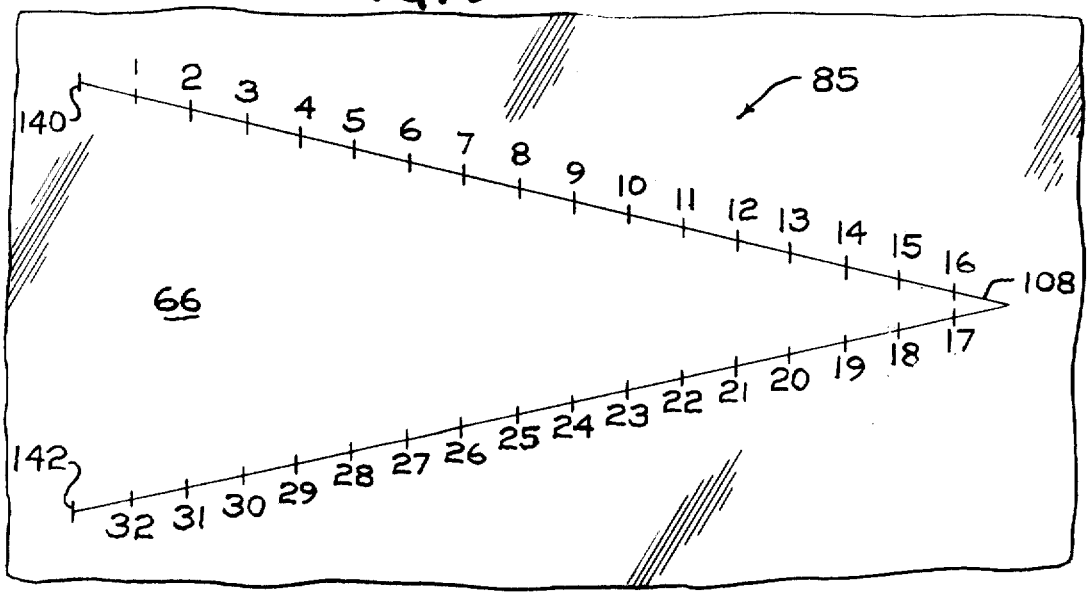

METHOD OF AND APPARATUS FOR DETECTING DEFECTS AND THE POSITION THEREOF IN TRANSPARENT ARTICLES

BACKGROUND OF THE INVENTION

1. Field of the Invention

This invention relates to a method of and apparatus for optically detecting defects in transparent articles, e.g. a glass ribbon, and determining the position of the defects in the article.

2. Discussion of the Prior Art

In methods of making glass by the known float process, plate process or sheet process, defects may be produced in the glass which render the glass optically imperfect. Among the optical imperfections that may be produced in these processes is distortion resulting from variations in glass composition and point-type defects, e.g. pits in the surface of the glass or inclusions in the glass such as bubbles. Variations in the composition of the glass ribbon may be exemplified by the Type B defects disclosed in U.S. Pat. No. 3,199,401 assigned to the assignee of the present invention. These Type B defects are known as strings, striae and ream. The point-type defects are exemplified by distortion immediately around the defect which causes different index of refraction, i.e. causes light to deviate from a predetermined path.

Glass manufacturers attempt to categorize various grades of glass for various purposes. For example, highest quality mirror glass has optical requirements far in excess of those necessary for commercial glass so that while certain not severe defects may be permitted in glass for high quality mirrors, other defects causing rejection of the mirror are acceptable for commercial glass.

At present there are available light scanning devices which are used by glass manufacturers to locate defects in the glass. These devices facilitate the categorization of the various grades of glass. However, these prior art scanning devices have limitations.

In U.S. Pat No. 3,609,308, a method and apparatus for detecting defects in glass by scanning the glass are disclosed. A beam of highly collimated light from a laser is reflected from a rotating prismatic mirror along the surface of a concave mirror. The reflected beam from the concave mirror passes through portions of the glass ribbon onto a light intensity responsive device located at the focal point of the concave mirror. Defects in the glass vary the intensity of the reflected beam. Each diminution of intensity of the reflected beam causes a drop in electrical energy.

The apparatus and method of U.S. Pat. No. 3,609,380 are limited in their application. More particularly, the apparatus is not sensitive enough to detect defects that affect the path of the light, e.g. point-type and B-type defects. This is because the beam as it is reflected at the corners of the prismatic miror changes intensity. Therefore, the variations in intensity caused by defects and corners of the prismatic mirror sensed by the intensity responsive device must be distinguished. As can be appreciated, facilities can be employed to distinguish the intensity variations caused by the defect from those caused by the corners of the mirror. But to do so would make the apparatus expensive. Another limitation of the apparatus is that the sides of the prismatic mirror are not equally spaced from the center of rotation. As the prismatic mirror rotates, the object position changes which changes the image position on the optical axes. These changes of the image and object positions cause the scanning beam incident on the light responsive device to shift laterally along the surface of the light responsive device. The sensitivity of the device is not uniform across the surface, therefore, output from the device varies as a function of the lateral movement of the scanning beam relative to the surface of the device. This makes it difficult for the device to distinguish between defects in the glass ribbon and variations caused by the lateral shifting of the scanning beam.

SUMMARY OF THE INVENTION

This invention contemplates a method of determining defects in a transparent article, e.g. a glass ribbon, that affect the path of light, e.g. Type B defects and point-type defects. A scanning light beam is transmitted toward an oscillating mirror to reflect the scanning beam toward a concave reflecting surface. The mirror is oscillated to displace the scanning beam along the concave reflecting surface to reflect the scanning beam from the concave reflecting surface through the ribbon along a scan path onto a photo detector. Defects in the ribbon vary the intensity in the scanning beam, which variations of intensity are sensed by the photo detector.

This invention also relates to an apparatus for carrying out the method of determining defects in the transparent article.

This invention also relates to a method of determining position of the scanning beam relative to the article including the steps of directing the scanning beam and a positioning beam toward the oscillating mirror to reflect the scanning beam and positioning beam toward the concave reflecting surface. As the mirror is oscillated, the positioning beam and scanning beam are synchronously displaced along the concave reflecting surface. The scanning beam is transmitted from the reflecting surface through the glass ribbon along a scan path onto a photo detector. Simultaneously, the positioning beam is transmitted from the reflecting surface toward position sensing facilities to actuate the sensing facilities to determine the position of the scanning beam relative to the surface of the glass ribbon.

This invention also relates to an apparatus for carrying out the method of determining the position of the scanning beam relative to the surface of the article including facilities for directing a beam of light toward expanding facilities to expand the light beam into the positioning beam and the scanning beam. The oscillating mirror displaces the scanning beam and positioning beam in synchronization along the concave reflecting surface. The scanning beam is transmitted toward the article along a scan path. The positioning beam is reflected toward position sensing facilities for indicating the position of the scanning beam relative to the surface of the article.

The position sensing facilities include a device for selectively actuating a light responsive device, e.g. a photocell. The actuating device in one embodiment includes a plurality of optical fiber bundles having their first end mounted in the path of the positioning beam and their second end advantageously connected to the photocell. The first ends of the bundles are spaced a predetermined distance apart corresponding to selected positions of the positioning beam. As the positioning beam is successively incident on the first ends of the bundles, the photocell is actuated to generate a pulse. The number of pulses of the photocell indicate the position of the positioning beam which corresponds to the position of the scanning beam relative to the glass ribbon.

Still further, this invention relates to a mirror characterized by a pair of forming members held in spaced relationship about a bendable strip having a specular surface, e.g. a tempered piece of glass having a mirror surface. The strip is advantageously held against the forming members to maintain the strip with a predetermined focal point. Changing the shape of the forming members changes the focal point of the mirror.

An oscillating directional mirror moves the scanning beam back and forth along the concave reflecting surface without changing the object plane and image plane. This is because the directional mirror oscillates about a point and the surface of the directional mirror which reflects the scanning beam toward the concave reflecting surface is generally equidistant from the center of oscillation. Another advantage of using an oscillating directional mirror is that there are no corners which can vary the path of the scanning beam. As previously discussed in the prior art, the scanning beam impinging on a corner of a prismatic mirror varies the intensity of the scanning beam. The photo detector senses the change in intensity of the scanning beam and indicates the presence of a defect when no defect is present. Using an oscillating mirror eliminates the above drawback because the scanning beam is always reflected from a flat surface which oscillates about a point.

Another feature of the invention is that the oscillating mirror has sufficient speed to inspect 100 percent of the ribbon, thereby making it possible to distinguish between point-type and B-type defects. Point-type defects as used herein include those defects that are associated with distortion, i.e. the area around the defect produces a lens effect, and generally exclude those defects that decrease the intensity of the scanning beam by absorption. B-type defects are the defects resulting from incomplete blending of the various batch ingredients during glass melting and fining operations. B-type defects extend generally in the direction of the glass draw and are oriented so that their length is aligned with the direction of glass draw. Inspecting 100 percent of the glass ribbon and providing facilities, i.e. a positioning beam and position sensing facilities, B-type and point-type defects can be determined and distinguished from each other. For example, a first pass of the scanning beam through a portion of the glass indicates a defect. As the scanning beam passes through the next succeeding contiguous adjacent portion in the direction of the glass draw, the length of the defect can be determined. The length of point-type defects is considerably smaller than the length of B-type defects, thereby making it possible to distinguish between the two types of defects.

BRIEF DESCRIPTION OF THE DRAWING

FIG. 2 is an elevated side view showing the relationship of a pair of beam generators to each other with one beam generator having portions cut away to illustrate subassemblies of the beam generators.

FIG. 3 is an elevated fron view of a beam generator having portions cut away for purposes of clarity.

FIG. 4 is an elevated side view of the apparatus of this invention inspecting a glass ribbon.

FIG. 5 is an illustration showing the relationship of the beam generators to the glass ribbon as well as scan path on the ribbon.

FIG. 6 is an elevated front view of the beam generators of this invention having portions cut away for purposes of clarity scanning a portion or zone of the glass ribbon and illustrating various positions of the scanning beam on the concave reflective mirror and the glass ribbon.

FIG. 7 is illustrative view showing position sensing facilities.

FIG. 9 is an illustration of a scan path divided into portions which portions correspond to light passing areas in a fresnell lens.

FIG. 11 is an isometric view of a concave mirror that may be used to practice the invention.

DESCRIPTION OF THE INVENTION

In general, a transparent article, e.g. a glass ribbon, and a scanning beam of light are displaced relative to each other to scan contiguous lateral portions of the glass ribbon for defects. The scanning light beam passing through the glass ribbon is incident on a photo detector which senses intensity of the scanning beam. Defects in the path of the scanning beam vary the intensity thereof which is sensed by the photo detector. A positioning beam is provided to indicate the position of the scanning beam relative to the glass ribbon to determine the position and the length of the defect in the glass ribbon.

The following discussion of the invention will be directed to determining B-type and point-type defects and the position thereof in the glass ribbon. However, as can be appreciated by those skilled in the art, the invention is not limited thereto.

Figure 1:
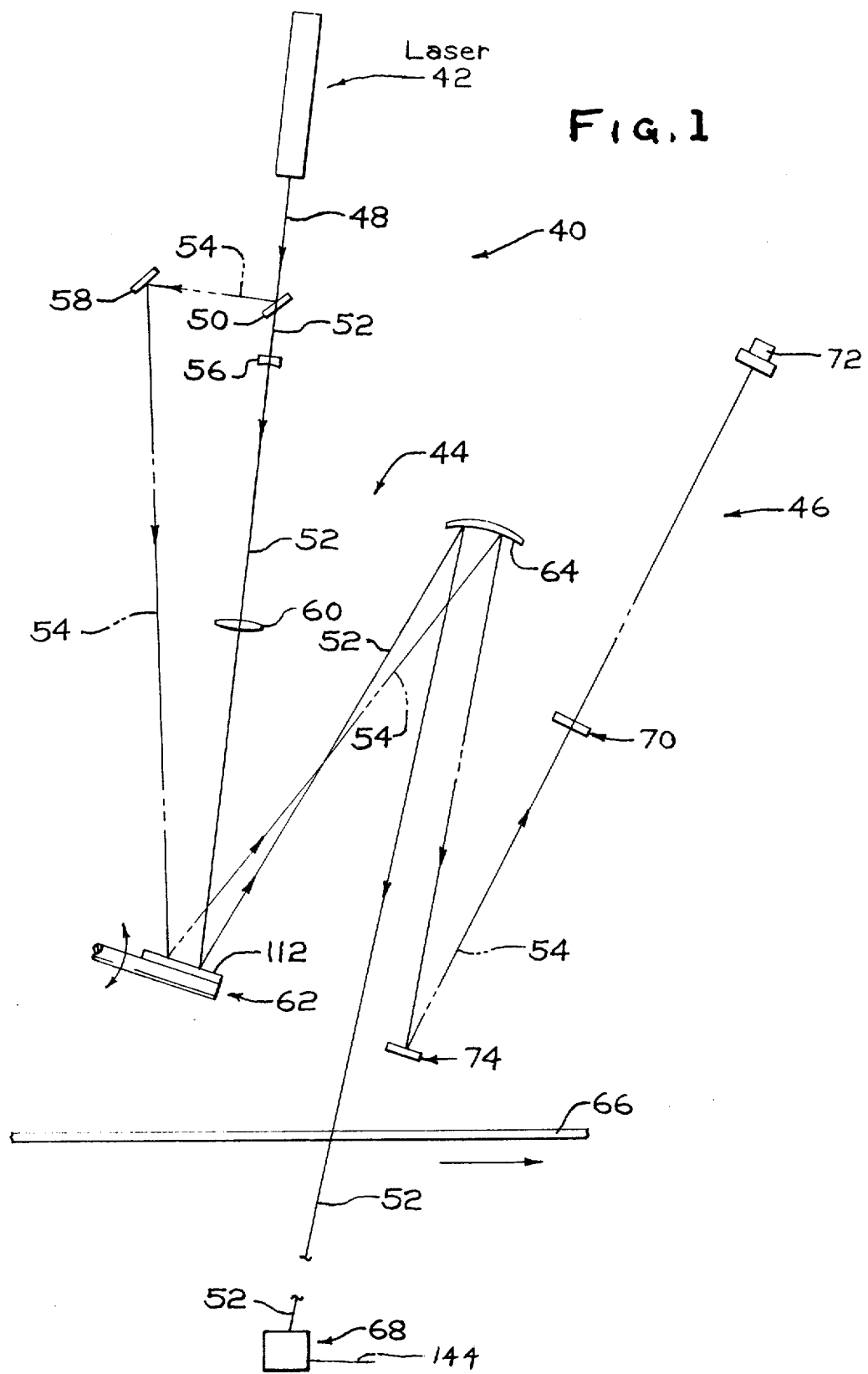
FIG. 1 is a pictorial view of an optical system employed with this invention.

Referring to FIG. 1, there is shown a pictorial view of an optical system 40 that may be used in the practice of this invention. The optical system 40 includes a light source 42, a mirror system 44 and position determining facilities 46.

The light source 42, such as a laser, directs a beam of light 48 toward a beam splitter 50 of the mirror system 44 to split the beam of light 48 into a scanning beam 52 and a positioning beam 54. The scanning beam 52 is transmitted through a diverging lens 56 and the positioning beam 54 toward a first stationary mirror 58.

The scanning beam 52 passes through the diverging lens 56 and then through a converging lens 60. The converging scanning beam is then incident on the surface of an oscillating directional mirror 62 which is positioned at a first focal point of a concave reflecting surface or mirror 64. The focal point and distance of the diverging lens 56 and the converging lens 60 are selected so that the scanning beam 52 is incident on the concave mirror 64 generally as a point.

As the oscillating directional mirror 62 rotates, the scanning beam 52 is reflected from the concave reflecting surface 64 and through a glass ribbon 66 along a scan path which is transverse to the movement of the glass ribbon, and the scanning beam is incident on the surface of a photo detector 68. The photo detector 68 is positioned at the second focal point of the concave reflecting surface so that the scanning beam is incident on the photo detector surface during a scanning cycle.

The positioning beam 54 is reflected from the first stationary mirror 58 and is incident on the oscillating directional mirror 62. The positioning beam 54 is reflected from the oscillating directional mirror 62 along the reflecting surface 64 in synchronous movement with the scanning beam 52.

The positioning beam 54 is transmitted from the reflecting surface 64 toward a fresnell lens 70 and a light responsive device 72 by way of a second stationary mirror 74. The light responsive device 72 is positioned at the focal point of the fresnell lens 70 so that the positioning beam passing through the fresnell lens is incident on the light responsive device.

Referring to FIGS. 2 and 3, the optical system 40 is shown advantageously mounted in a housing 76 of a scan beam generator 78. As shown in FIG. 2, scan beam generators 78 are advantageously mounted on a support 80 above the glass ribbon 66 (see FIG. 4). The arrangement of the scan beam generators relative to the glass ribbon will be discussed below.

With reference to FIG. 3, as the oscillating directional mirror 62 rotates in a clockwise direction, as viewed in FIG. 3, the scanning beam 52 and positioning beam 54 are synchronously displaced from left to right across the reflecting surface 64. Rotating the oscillating directional mirror 62 in a counterclockwise direction, the scanning beam and positioning beam are displaced from right to left across the reflecting surface 64, as viewed in FIG. 3.

As the scanning beam is displaced along the reflecting surface, the scanning beam is reflected from the reflecting surface along a scan path to be discussed below. The positioning beam 54 as it is displaced from left to right across the reflecting surface 64 is transmitted from the reflecting surface along the second stationary mirror 74 from left to right, as viewed in FIG. 3. The positioning beam is reflected from the second stationary mirror 74 along the fresnell lens 70 from left to right, as viewed in FIG. 3, incident on the light responsive device 72.

SCAN BEAM GENERATOR

Referring to FIG. 4, there is shown a side view of a pair of scan beam generators 78 mounted on the support member 80 above the glass ribbon 66 moving from left to right, as viewed in FIG. 4, on conveyor rollers 82. Referring to FIG. 5, a series of beam generators 78 are mounted on one side of the support 80 a predetermined distance apart and another series of beam generators are mounted on the other side of the support member a predetermined distance apart with one series of beam generators offset from the other series of beam generators. Each of the beam generators scan a predetermined lateral portion of the glass ribbon 66.

Referring back to FIG. 4, the beam generators 78 are at an angle with respect to the glass ribbon 66 so that (1) scanning beam 52 is at an angle of incidence to the glass surface of greater than zero to prevent beams reflected from the glass surface from reflecting back along the path of the scanning beam, and (2) foreign particles are prevented from falling onto the surface of the photo detector 68 associated with a beam generator.

When the scanning beam passes through the glass ribbon at an angle of incidence of zero, a portion of the scanning beam is reflected from the surface of the glass ribbon back along the path of the scanning beam. This results in interference fringes that appear on the surface of the photo detector as interference lines. Although the method of the invention will give satisfactory results with the scanning beam at an angle of incidence of zero, it is recommended for optimum results to have the scanning beam at an angle of incidence slightly larger than zero. Further, it is recommended that the scanning beam have an angle of incidence greater than zero to prevent foreign particles from falling on the surface of the photo detector, thereby affecting the efficiency of the photo detector.

To prevent particles from falling onto the surface of the photo detector 68, a pair of plates 84 are mounted beneath the conveyor rollers 82 and angled toward each other as shown in FIG. 4. The photo detectors 68 are offset from a center line between the plates 84 and in the path of the scanning beam 52. With this arrangement, particles and broken glass falling between the plates 84 will not fall on the photo detectors 68.

Referring now to FIG. 6, the oscillating directional mirror 62 is advantageously rotated or oscillated clockwise and counterclockwise as shown in FIG. 6 to displace the scanning beam 52 along the surface of the concave reflecting surface 64. More particularly, as viewed in FIG. 6, as the oscillating directional mirror 62 rotates clockwise, the scanning beam is displaced from the extreme left position, i.e. the initial position, along the reflecting surface to the extreme right position, i.e. the mid-scanning cycle position to scan a portion of the glass ribbon along a scan path. As the oscillating directional mirror rotates counterclockwise, the scanning beam moves from the mid-scanning cycle position along the reflecting surface toward the initial position to scan a portion of the glass ribbon along the scan path.

The scan path is generally transverse to the path of the glass ribbon 66. A zone of the scan path 85 (see FIG. 5) is determined by (1) the distance of the glass ribbon 66 from the concave reflecting surface 64, (2) the arc of the concave reflecting surface 64, and (3) the arc subtended by the oscillating directional mirror 62 (see FIG. 6).

As can be appreciated by those skilled in the art, the beam generators 78 may be displaced relative to the glass ribbon instead of the ribbon being displaced relative to the beam generators 78. Further, the invention is not limited to the number of scan beam generators employed to practice the invention. As can be appreciated by those skilled in the art, one beam generator may be used to scan a glass ribbon.

POSITIONING BEAM

With reference to FIG. 3 and as previously discussed, the positioning beam 54 as it is displaced across the reflecting surface 64 is displaced across the second stationary mirror 74 and toward the fresnell lens 70.

Referring now to FIG. 7, the fresnell lens 70 is provided with a photocell 86 and the surface of the fresnell lens is selectively coated with a light-absorbing paint 88 to provide light-passing areas 90 through which the positioning beam can pass to actuate the light responsive device 72 and light-absorbing areas 92 to block the positioning beam from the light responsive device 72.

Figure 8:
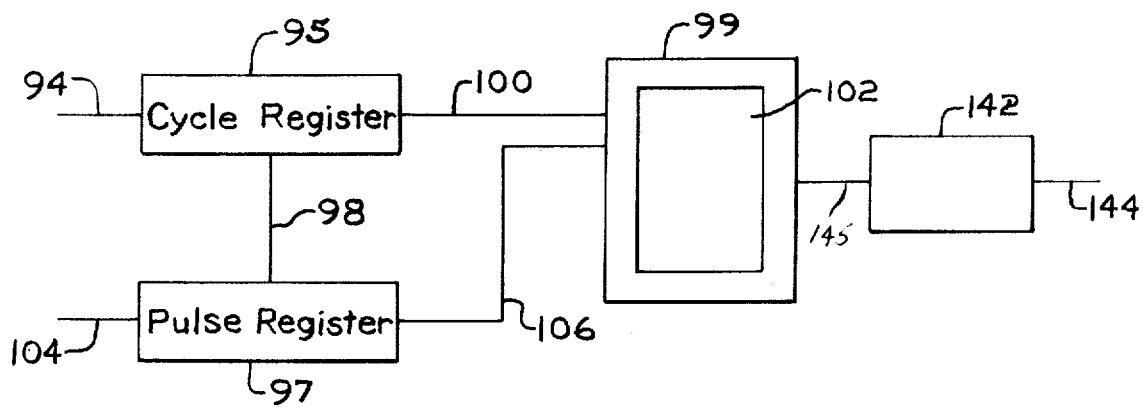
FIG. 8 is a block diagram of electrical components used in the practice of the invention.

Referring now to FIGS. 7 and 8, when the positioning beam is incident on the photocell 86, a pulse is forwarded by way of cable 94 to a register 95 (hereinafter referred to as a cycle register). Upon receiving the pulse from the photo cell 86, the cycle register 95 (1) records a digit indicating the number and start of a scan cycle, (2) clears register 97 (hereinafter referred to as a pulse register) by forwarding a pulse along cable 98, and (3) forwards a signal to a strip chart recorder 99 by way of cable 100 which appropriately signifies the number of the scan cycle on a chart 102. By recording the number of scan cycles, the position of the scanning beam along the direction of glass draw is known. When the positioning beam passes through a light-passing area 90, the positioning beam is incident on the light responsive device 72 which forwards a pulse to the pulse register 97 by way of cable 104. As the positioning beam passes over a light absorbing area 90, the pulse register resets and is actuated once again when the positioning beam passes over a light-passing area and is incident on the light responsive device. Upon receiving the pulses from the light responsive device, the pulse register 97 records the number of pulses and for each pulse forwards a signal by way of cable 106 to the strip chart recorder 99 which appropriately records the pulse number on the chart 102. By recording the pulse number, the portion of the scan path scanned by the scanning beam is known.

With reference to FIGS. 3, 7 and 8 consider the following example. When the scanning beam 52 is at the initial position on the reflecting surface 64, as shown in FIG. 3, the positioning beam 54 is incident on the photocell 86. A pulse from the photocell 86 is forwarded to the cycle register 95 which increases the number in the cycle register 95 by one and forwards a pulse to the strip chart recorder 99 which appropriately marks the chart 102. The cycle register 95 simultaneously forwards a signal to the pulse recorder to clear the pulse recorder 97. By controlling the speed of the glass ribbon and the speed of the scanning beam, the length of the glass ribbon scanned for each cycle can be determined. Recording the scan cycle number and knowing the length of the ribbon covered during a scan cycle, the position of the scanning beam along the glass draw can be determined. As the scanning and positioning beams are synchronously displaced along the reflecting surface 64 by rotating the oscillating directional mirror 62 in a clockwise direction, as viewed in FIG. 3, the positioning beam is moved from left to right, as viewed in FIG. 3, from the photocell 86 onto an adjacent light-absorbing area 92 of the fresnell lens 70 and then to one of the light-passing areas 90 (see FIG. 7). Simultaneously with the movement of the positioning beam across the surface of the fresnell lens, the scanning beam moves from the initial position on the concave reflecting surface 64 to the right to start scanning the glass ribbon 14 for defects along a scan path 108, as shown in FIG. 9. The intensity sensed by the photo detector is recorded on the chart 102 in a manner to be described hereinbelow. The positioning beam passes through a light-passing area 90 and is incident on the light responsive device 72 which forwards a pulse to the pulse register 97. The pulse register records a one and forwards a signal to the strip chart recorder 99 to mark the chart 102 with a 1. The scanning beam has scanned the position of the scan path 108 between the start of the scan path and 1 as shown in FIG. 9. The intensity sensed by the photo detector is recorded on the chart 102 between the mark signifying the start of the scan cycle and the number 1.

The scanning beam and positioning beam are further displaced to the left as viewed in FIG. 3 to move the scanning beam along the scan path 108 and the positioning beam along the surface of the fresnell lens 70 (see FIGS. 7 and 9). The positioning beam moves onto an adjacent light-absorbing area 92 allowing the pulse counting register 97 to reset while the scanning beam is further displaced along the scan path 108, while the intensity sensed by the photo detector is continually recorded on the chart 102. Further, displacement of the positioning and scanning beams to the left as viewed in FIG. 3 moves the positioning beam to the adjacent light-passing area 90 to actuate the light responsive device as before (see FIG. 7). Two pulses have now been registered in the pulse register 97 and a two is marked on the chart 102. The scanning beam is now at a position on the scan path corresponding to a pulse count of 2 (see FIG. 9). The chart has recorded the intensity sensed by the photo detector for portions of the scan path between the start of the scan cycle and number 2 on the scan path 108 (see FIG. 9).

The above is repeated until the scanning beam is at the mid-cycle position on the concave reflecting surface, i.e. the extreme right-hand portion of the concave reflecting surface 64 as viewed in FIG. 3, and the positioning beam is moved onto the light-absorbing area 92 to the right of the last light-passing area 90 as viewed in FIG. 7.

The oscillating directional mirror is now rotated counterclockwise to move the positioning beam and the scanning beam from the mid-cycle position on the concave reflecting surface to the left as viewed in FIG. 3 toward the initial position. The scanning beam is now displaced along the scan path from right to left and the positioning beam along the fresnell lens from right to left as viewed in FIGS. 3 and 7, respectively. As before, each time the positioning beam moves past a light-passing area, the light responsive device is actuated and forwards a pulse to the pulse register to increase the number therein while recording the number on the chart. The intensity recorded on the chart is divided into portions corresponding to portions on the scan path as shown in FIG. 9.

At the end of a scan cycle, the positioning beam is incident on the photocell 86 and the scanning beam is at the extreme left or the initial position of the concave reflecting surface 46 as viewed in FIG. 3. The photocell 86 forwards a pulse to the cycle register 95 to (1) record a digit indicating the start of the next scanning cycle, (2) clear the pulse register 97, and (3) mark the chart to indicate the start of the next scan cycle. By repeating the above procedure, the chart 102 will display a scanning profile of the glass ribbon. The width of the light-blocking areas 92 of the fresnell lens 70 (see FIG. 7) should be greater than the diameter of the positioning beam incident on the fresnell lens, thereby blocking the positioning beam from the light responsive device which permits the pulse register to reset.

As can be appreciated by those skilled in the art, the light-absorbing coating 88 on the surface of the fresnell lens 70 may be replaced with a photographic film having areas selectively exposed to pass light. Further, as can be appreciated by those skilled in the art, the direction of the scanning and positioning beams during the scan cycle is arbitrary and the beam may move in either direction.

Figure 10:
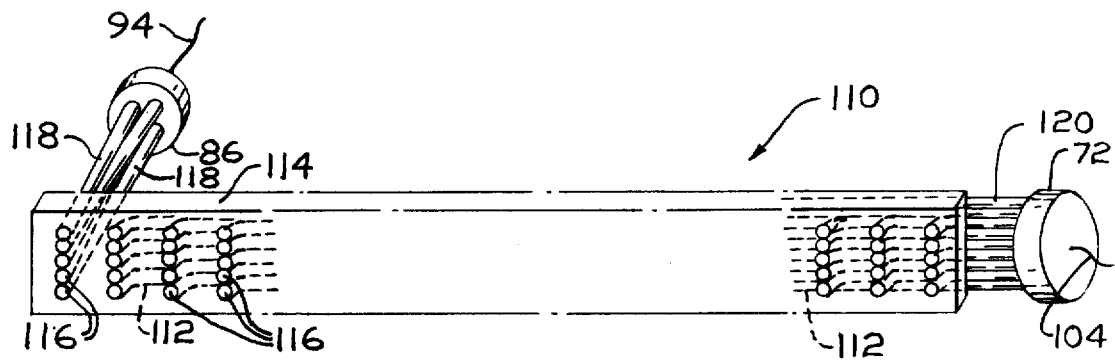
FIG. 10 is an illustration of a position detecting device that may be used to practice the invention.

Referring to FIG. 10, there is shown a positioning detecting device 110 that may be used instead of the fresnell lens 70. The device 110 includes a series of optical fiber bundles 112 which are advantageously mounted on a member 114 such that one end 116 of each of the optical fiber bundles 112 is in the path of the positioning beam. The other end 118 of the bundle at the extreme left of the member 114, as viewed in FIG. 10, is advantageously connected to the surface of the photocell 86. The other ends 120 of the remaining bundles are advantageously connected to the surface of the light responsive device 72. The ends 116 of the bundles are equally spaced and correspond to selected positions on the scan path in like manner as the light-passing areas 90 of the fresnell lens 70 (see FIG. 7). When the positioning beam is incident on an end 116 of the fiber optical bundle, the light passes from the end 116 to the opposite end 118 or 120 to actuate the photocell 86 or the light responsive device 72, respectively, in a like manner as previously discussed. When the positioning beam is incident on the space between the ends of the fiber optical bundles, the light responsive device 72 responds in a like manner as previously discussed when the positioning beam is incident on the light-absorbing areas 90 of the fresnell lens 70 (see FIG. 7).

Although the fresnell lens 70 and the position detecting device 110 are both acceptable for sensing the position of the positioning beam, the position detecting device 110 shown in FIG. 10 is preferred. This is because the position detecting device 110 (1) eliminates the second stationary mirror 74 (see FIG. 3), and (2) does not require adjusting the photocell at a focal point, e.g. at the focal point of the fresnell lens. The position detecting device 110 may be advantageously mounted at the position of the second stationary mirror 74 as shown in FIG. 3.

As can be appreciated by those skilled in the art, the number of light-passing areas can be increased to decrease the portion of the scan path associated with the light-passing area to give a more definitive scanning beam intensity profile of the glass ribbon.

OSCILLATING DIRECTIONAL MIRROR

Referring to FIGS. 2 and 3, the oscillating directional mirror 62 includes a front surface mirror 122 advantageously mounted on facilities such as a galvanometer 124 which oscillates the mirror through a predetermined arcuate path at a predetermined speed. The surface of the mirror is at the center of rotation of the galvanometer so that the object plane does not shift, therefore, the image plane does not shift. This eliminates lateral shifting of the scanning beam on the surface of the light responsive device.

An oscillating directional mirror has distinct advantages over a rotating prismatic mirror. More particularly, an oscillating directional mirror displaces the scanning beam back and forth along the surface of the concave reflecting surface, and the scanning beam is always incident on the surface photo detector (see FIG. 6). A rotating prismatic mirror displaces the scanning beam in one direction only along the surface of a concave reflecting surface. When the scanning beam is incident on the corners of the prismatic mirror, i.e. at the end of the scanning beam displacement across the reflecting surface and the start of another scanning beam displacement, the intensity of the scanning beam varies. The photocell senses the intensity variation indicating a defect when in fact no defect may be present in the glass ribbon. Another limitation of the rotating prismatic mirror is that the reflecting surfaces of the prismatic mirror are at varying distances from the center of rotation. As the prismatic mirror rotates, the object position changes because of the sides of the mirror being at varying distances from the center of rotation. When the object position changes, the image position on the optical axis changes. These changes of the image and object positions cause the scanning beam incident on the light responsive device to laterally shift along the surface of the light responsive device. As is well known, the sensitivity of the light responsive device is not uniform across the surface, therefore, output from the device varies as a function of the lateral movement of the scanning beam relative to the surface of the device. This makes it difficult for the device to distinguish between defects in the glass ribbon and variations caused by the lateral shifting of the scanning beam. All of the above disadvantages are eliminated by using an oscillating directional mirror. This is because the mirror has a flat reflective surface and the beam is incident on the surface equidistant from the center of oscillation.

The oscillating directional mirror 62 is positioned at the first focal point of the concave reflecting surface 64 and is preferably oscillated through an arcuate path such that the positioning beam and scanning beam remain on the surface of the concave reflecting surface. Further, the speed of the directional mirror 64 is selected in relationship to the speed of the glass ribbon 66 such that contiguous lateral portions of the glass ribbon are scanned. This feature of the invention will be discussed in more detail hereinbelow.

CONCAVE MIRROR

Referring to FIG. 6, the concave reflecting surface or mirror 64 is positioned in the housing 76 relative to the glass ribbon 66 to scan the glass ribbon along a scan path 108 defined by the zone 85 of the glass ribbon 66 as shown in FIG. 5. The length of the zone 85 is determined by (1) the arc of the reflecting surface, (2) the distance between the reflecting surface and the glass ribbon, and (3) the arc subtended by the oscillating directional mirror 62. The width of the scan path in the zone is determined by the distance between the glass ribbon and the concave mirror 64. The scanning beam reflected from the concave mirror diverges, therefore, as the distance between the concave mirror and glass ribbon increases, the width of the scan path increases.

In general, any commercially available elliptical or spherical concave mirror is acceptable. In the instance where a spherical mirror is employed, electronic filters should be used to correct for light variations, i.e. signal variations due to spherical aberrations.

Shown in FIG. 11 is a concave mirror 126 construction that has proven satisfactory and is inexpensive. The concave mirror 126 includes a pair of members 128 held in spaced parallel relationship to each other by way of a series of spacer pins 130. Each of the surfaces of the members 128 facing each other are provided with a forming surface 132 having a curvature which defines the focal length of the concave mirror 126. A piece of tempered glass 134 having a front mirror surface is positioned between the members 128 and urged against the forming surface 132 by way of L-shaped mounting lugs 134. The lugs 134 urge the top portion and the bottom portion of the tempered glass 134 (as viewed in FIG. 11) against the forming surfaces 132 of the members 128 and are secured in place by fasteners 138. The tempered glass 134 should be thick enough to be tempered but thin enough to bend. Thickness of about 0.1 inch has been found to be satisfactory.

As can be appreciated by those skilled in the art, the mirror need not be made of tempered glass having a front mirror surface but may be made of any bendable material having a specular surface. Further, the members that form the tempered glass may be of any construction as long as a surface is provided having a curvature to provide the tempered glass with a focal point.

The concave mirror 126 is mounted in any conventional manner in the housing 76.

SCANNING PATTERN

Referring to FIG. 5, there is shown a scan pattern on the surface of the glass ribbon 66. The scan pattern is divided into zones 48 which are each associated with a beam generator 78. The zones 48 are spaced a predetermined distance apart with the ends of one zone overlapping the ends of adjacent zones so that 100 percent of the glass ribbon is scanned between its sides. This may be accomplished by mounting a series of beam generators 78 on one side of the support member 80 a predetermined distance apart and another series of beam generators on the other side of the support member a predetermined distance apart with one series of beam generators offset from the other series of beam generators.

The length of the zones 85 is determined by (1) the distance between the glass ribbon 66 and the reflecting surface 64, (2) the length of the arc of the reflecting surface, and (3) the arc subtended by the oscillating directional mirror. The width of the scan path in a zone is determined by (1) the distance between the glass ribbon and the reflecting surface 64, and (2) the length of the surface of the photo detector 68. Although not required to practice the invention but recommended to inspect 100 percent of the glass ribbon for defects, the speed of the directional oscillating mirror, the speed of the glass ribbon, the diameter of the scanning beam impinging on the surface of the glass ribbon, and the length of the surface of the photo detector 68 should be selected such that the distance between the start of the scan path 140 and the end of the scan path 142, i.e. the start of the next scan path (see FIGS. 5 and 9) is less than the diameter of the scanning beam incident on the surface of the glass ribbon and the length of the surface of the photocell 86 is approximately equal to the diameter of the scanning beam incident on the surface of the photo detector. In this manner, contiguous lateral portions of the glass ribbon can be inspected.

As can be appreciated, the number of zones in the scanning pattern is not limited. Further, each beam generator may scan independently or in synchronization with other beam generators.

PHOTO DETECTOR

Referring to FIG. 4, the photo detector 68 may be any of the conventional types known in the art used for determining defects that vary the path of the scanning beam, i.e. point-type or B-type defects, in a glass ribbon. One type that may be used is disclosed in U.S. Pat. No. 3,199,401. Another type is that sold by United Detector Technology Inc., Model PIN LSC/4, which is a solid state photo detector device having a slit configuration. The photo detector is positioned at the second focal point of the reflecting surface 64 as shown in FIGS. 4 and 6 so that the scanning beam, as it passes through the glass ribbon, is incident on the surface of the photo detector during the scanning of a zone of the glass ribbon. Each of the beam generators have a photo detector associated therewith as shown in FIG. 4.

Each of the photo detectors 68 are connected by way of cable 144 to an electrical system 142 (see FIG. 8) such as the type disclosed in U.S. Pat. No. 3,199,401 for converting the pulses of the photo detector to a signal pattern which is continuously recorded on the chart 102 of the recorder 99 (see FIG. 8). The signal pattern is forwarded to the strip chart recorder 99 by way of cable 145. The photo detector 68 responds to varying intensity of the scanning beam and forwards a signal to the system 142 which is responsive to the intensity of the scanning beam. Changes of intensity of the scanning beam are caused by point-type or B-type defects which vary the scanning beam from its predetermined path.

Referring to FIG. 8, the system 142 acts on the recorder 99 to record the intensity of the scanning beam on the chart 102. Simultaneously the pulse register 97 and cycle register 95 operate on the strip chart recorder 99 in a manner as previously described to mark the chart 102 each time the photocell 86 (see FIG. 7) forwards a pulse to the cycle register 95 and each time the light responsive device 72 (see FIG. 7) forwards a pulse to the pulse counting register 97. In this manner, a scanning beam intensity profile of the glass ribbon can be made. The position of the defect in the ribbon as well as the type of defect, i.e. whether a B-type or point-type defect, can be determined.

With reference to FIGS. 8 and 9, consider the following example. It is assumed that the chart 102 shows a defect at portions along the scan path between 1-2, 5-6 and 31-32 for the 5 scan cycle and between 1-2 and 31-32 for the 6 scan cycle. Further, the intensity of the scanning beam between the portion of the scan path between 5-6 is higher than between portions 1-2 and 31-32 for the 5 and 6 scan cycle. This normally indicates that the defect in the glass ribbon between positions 1-2 and 31-32 for the 5 and 6 scan cycle is a B-type defect and the defect between portions 5-6 of the scan path is a point-type defect. This determination is made based on the fact that the point-type defects have stronger intensity and a shorter length than B-type defects.

As can be appreciated, other types of photo detectors may be used with the beam generator to sense variations in a light beam caused by defects in the glass ribbon. Further, the beam generator and photo detector may be positioned on the same side of the glass ribbon. In this instance, the photo detector senses the intensity of the reflected beams from at least one surface of the glass ribbon while the positioning beam indicates the portion of the glass ribbon being scanned.

Further, the cycle counting register 95, the pulse counting register 97 and the system 142 may be connected to any other number of devices which are desirable in the subsequent processing of the glass ribbon such as markers which mark the glass ribbon for cutting.

DETAILED DESCRIPTION

One embodiment of the method and apparatus of the invention will now be discussed in detail to scan a glass ribbon for point-type and B-type defects. As can be appreciated by those skilled in the art, the invention is not limited thereto.

Referring to FIGS. 4 and 5, two rows of scan beam generators 78 are advantageously mounted to each side of a support member 80 such that a scanning beam has an angle of incidence of 6° or 7° to a line normal to the surface of glass ribbon 66 to reflect the portion of the scanning beam reflected from the surface of the glass ribbon away from the beam generators. In one row, there are six beam generators spaced about 14 inches apart and offset from five scan beam generators in the other row spaced about 14 inches apart. Each of the generators has a concave elliptical mirror (see FIG. 3) about 24 inches in length having a first focal point of 29¼ inches and a second focal point of 192¼ inches. The concave mirror is spaced about 50½ inches from the glass ribbon 66 to scan about a 16-inch lateral zone of the glass ribbon. By providing eleven generators having capabilities of scanning about a 16-inch zone, the width of a glass ribbon 160 inches wide can be scanned 100 percent for defects across its width.

Referring to FIGS. 1 and 2, a light beam 48 from a multi-mode helium neon laser 42 passes through a beam splitter 50. The light beam 48 is split into (1) positioning beam 54 which is incident on a first stationary mirror 58 and on mirror 112 of an oscillating directional mirror 62, and (2) into scanning beam 52 which is transmitted through a diverging lens 56, a converging lens 60 and is incident on the mirror 112 of the oscillating directional mirror 62. The oscillating directional mirror 62 is positioned at the first focal point of the concave reflecting surface 64. The diverging lens has approximately a 10 millimeter diameter and a focal point of 20 millimeters; and the converging lens has approximately a 30 millimeter diameter and 250 millimeter focal length. The diverging lens and converging lens are spaced 25½ inches and 11½ inches, respectively, from the oscillating directional mirror 64.

Referring to FIGS. 3 and 6, the oscillating directional mirror 62 is rotated by the galvanometer 124 counterclockwise as viewed in FIG. 3 to synchronously displace the scanning beam and positioning beam from left to right across the concave reflecting surface 64 as viewed in FIG. 3. The scanning beam is reflected through the glass ribbon and is incident on a photo detector 68 positioned at the second focal point of the concave reflecting surface, i.e. 192¼ inches from the reflecting surface. The photo detector 68 is the type sold by United Detector Technology, Inc., Model PIN LSC/4 having a slot approximately 4 inches in length. The scanning beam at the surface of the glass ribbon covers a 2-inch diameter circular portion. The speed of the galvanometer is 15 cycles per second and the speed of the ribbon is 1800 inches per minute. As the scanning beam is displaced along a scan path 108 (see FIG. 5), the distance between the start of the scan path 140 and end of the scan path 142 on the glass ribbon is 2 inches. By providing (1) a beam at the surface of the glass ribbon having a 2-inch diameter, (2) the distance between scanning paths of 2 inches, and (3) a photo detector having a slot 4 inches in length, the entire length of the glass ribbon may be inspected for defects.

Referring back to FIGS. 2 and 3, the positioning beam is reflected from the concave reflecting surface 64 and is incident on a second stationary mirror 74 which reflects the positioning beam toward a fresnell lens 70 and a light responsive device 72 mounted at the focal point of the fresnell lens.

Referring to FIGS. 4, 6, 7, 8 and 9, when the scanning beam is at the initial position, i.e. the extreme left-hand position of the concave mirror 46 (see FIG. 6), the positioning beam is incident on a photocell 86 of the fresnell lens 70 (see FIG. 7). The photocell forwards a pulse to cycle register 95 to register the number of a scanning cycle on the chart 102 and to set the pulse register 97 to zero (see FIG. 8). As the glass ribbon moves from left to right as viewed in FIG. 4, the galvanometer oscillates the mirror clockwise as viewed in FIG. 6 to synchronously displace the scanning beam and positioning beam from left to right across the concave reflecting surface 64. The scanning beam is displaced along the first half of the scan path 108 as the positioning beam is displaced from left to right across the coated surface of the fresnell lens as viewed in FIG. 7. As the positioning beam is successively displaced over each one of 16 light-absorbing areas 90, the positioning beam actuates the light responsive device which forwards a signal by way of cable 104 to a pulse register 97 (see FIG. 8). For each signal received by the pulse counter, the number registered therein is increased by one and the new number forwarded to the strip chart recorder 99 and is recorded on chart 102.

Referring to FIG. 6, the photo detector 68 is continually monitoring the intensity of the scanning beam and forwarding pulses representative of the intensity sensed by the photo detector 68 by way of cable 144 to system 142 shown in FIG. 8. The system 142 converts the pulses from the photo detector to a signal pattern which is recorded on the chart 102 of the strip chart recorder 99. As the intensity is being recorded on the chart, for each pulse of the photocell 86, the cycle register 95 forwards a signal to the strip chart recorder to mark the chart 102 to indicate what cycle of scan the following intensity readings pertain to. Each pulse forwarded from the light responsive device 72 shown in FIG. 7 to the pulse register 97 shown in FIG. 8 increases the count in the register 97 and forwards a signal to the strip chart recorder 99 to mark the chart 102 to indicate the portion of the scan path that the intensity recorded pertains to.

At the end of the first half of the scanning cycle, the pulse counter register has registered 16 counts, one count for each light-passing area which corresponds to predetermined 1-inch lengths of the scan path. At the start of the second half of the scan cycle, the directional oscillating mirror is rotated counterclockwise as viewed in FIG. 6 to displace the scanning beam and positioning beam from right to left across the concave reflecting surface 64. The scanning beam is moved along the second half of the scan cycle and the positioning beam is moved from right to left across the fresnell lens 70 as viewed in FIG. 7.

At the end of the second half of the scanning cycle, the scanning beam is at the initial position on the concave mirror (see FIG. 6) and the positioning beam is incident on the photocell 86 (see FIG. 7). A signal from the photocell is forwarded to the cycle register 95 to indicate the start and number of the next scanning cycle and clearing the pulse register 97. The system is now ready to scan another portion of the ribbon for defects. By recording the number of cycles of scan and recording intensities as a function of pulse counts, it is possible to determine if the defect is a point-type or B-type defect, as well as the position of the defect on the ribbon.

More particularly, a profile of intensity variations for the glass ribbon may be made on the chart 102 from the data received from the cycle counting register 95, the pulse counting register 97 and the system 142. Point-type defects as contrasted to B-type defects have a higher intensity and a shorter length. Noting the length of the defect and the intensity, B-type defects can be distinguished from point-type defects. The position of the defect on the glass ribbon can be determined from the scan cycle number and between which pulse counts the defect was sensed by the photo detector. In this manner, a complete inspection of the glass ribbon can be made for point-type and B-type defects in the glass ribbon as a function of position in the glass ribbon.

What is claimed is:

1. A method of determining defects in a glass ribbon as a function of position in the glass ribbon, comprising the steps of:

directing a first beam of light toward a first surface of the glass ribbon as a scanning beam of light;

directing a second beam of light toward position sensing means as a positioning beam of light;

synchronously displacing (1) the scanning beam of light relative to the surface of the glass ribbon along a predetermined scan path and (2) the positioning beam relative to the position sensing means wherein the beams of light are synchronously displaced at a predetermined constant speed;

sensing the intensity of the scanning beam of light with a photo detector as the scanning beam of light is moved with respect to the glass ribbon to determine defects in the glass ribbon along the scan path wherein defects in the glass ribbon along the scan path vary the intensity of the scanning beam of light; and monitoring the position sensing means and the photo detector to determine the position of the scanning beam along the scan path to determine defects in the glass ribbon as a function of position in the glass ribbon.

2. The method as set forth in claim 1 wherein said synchronously displacing step is accomplished by:

transmitting the scanning beam of light and positioning beam of light toward a reflecting means positioned at the focal point of a concave specular surface to reflect the beams of light toward the concave specular surface;

oscillating the reflecting means at a predetermined constant speed to synchronously displace the beams of light along the specular surface to reflect the scanning beam of light from the specular surface to scan a portion of the glass ribbon along the scan path and to transmit the positioning beam toward and relative to the position sensing means.

3. The method as set forth in claim 1 further including the step of:

displacing the glass ribbon and scanning beam relative to one another at a predetermined constant speed in a direction generally transverse to the scan path to scan contiguous lateral portions of the glass ribbon for defects.

4. The method as set forth in claim 1 wherein the scanning beam passes through the glass ribbon and is incident on the photo detector to sense intensity of the scanning beam.

5. The method as set forth in claim 1 wherein the scanning beam is incident on the surface of the glass ribbon and is reflected from at least one surface of the glass ribbon and the reflected scanning beam is incident on the photo detector to sense intensity of the reflected scanning beam.

6. A method of determining defects in a glass ribbon as a function of position in the glass ribbon, comprising the steps of:

directing a beam of light toward expanding means;

expanding the light beam into a positioning beam of light and a scanning beam of light;

directing the scanning beam and the positioning beam toward reflecting means positioned at a focal point of a concave specular surface to reflect the scanning beam from the reflecting means to the specular surface and to reflect the positioning beam from the reflecting means to the specular surface;

transmitting the scanning beam from the specular surface through the glass ribbon onto a photo detector positioned at a second focal point of the concave specular surface and the positioning beam from the specular surface to position sensing means;

oscillating the reflecting means at a predetermined constant speed to synchronously displace the scanning beam and positioning beam across the specular surface such that (1) the scanning beam scans a portion of the glass ribbon along a scan path and the positioning beam is displaced relative to the position sensing means;

displacing the glass ribbon relative to the scanning beam at a constant predetermined speed in a direction generally transverse to the scan path to scan contiguous lateral portions of the glass ribbon;

sensing the intensity of the scanning beam passed through the ribbon by the photo detector wherein intensity variations of the scanning beam passed through the ribbon are indicative of defects in the glass ribbon; and monitoring the position sensing means and the photo detector to determine defects in the glass ribbon as a function of position in the glass ribbon.

7. An apparatus for determining defects in a glass ribbon as a function of position in the glass ribbon comprising:

means for detecting defects in the glass ribbon;

means for directing a scanning beam of light toward the glass ribbon and from the glass ribbon onto said detecting means;

means for sensing movement of a beam of light;

means for directing a positioning beam of light toward said movement sensing means;

means for synchronously displacing the positioning beam and scanning beam at a predetermined constant speed to displace the scanning beam of light relative to the surface of the glass ribbon along a predetermined scan path incident on said detecting means and to displace the positioning beam of light relative to said movement sensing means; and means acted on by said detecting means and said movement sensing means for indicating the intensity and the position of the scanning beam along the scan path to determine defects in the glass ribbon as a function of position in the glass ribbon.

8. The apparatus as set forth in claim 7 further including:
means for displacing the scanning beam of light and glass ribbon relative to one another at a predetermined constant speed to scan contiguous lateral portions of the glass ribbon for defects.

9. The apparatus as set forth in claim 7 wherein said means for synchronously displacing the positioning beam and scanning beam comprises:
a concave specular surface; and
an oscillating mirror means mounted at the focal point of said concave specular surface and in the path of the scanning beam and positioning beam to synchronously displace the scanning beam and positioning beam along the surface of said concave specular surface wherein the scanning beam is reflected from said specular surface to the glass ribbon along the scan path and the positioning beam is reflected from said specular surface relative to said movement sensing means.

10. The apparatus as set forth in claim 7 wherein said means for sensing movement of the positioning beam includes:
a first light responsive device actuated by the positioning beam at the start of a scanning cycle; and
a second light responsive device actuated by the positioning beam at selected intervals as the scanning beam moves along a scan path wherein a selected interval corresponds to a selected portion of the scan path.

11. The apparatus as set forth in claim 10 further including:
a fresnell lens having light-absorbing and light-passing areas spaced a predetermined distance apart along the surface of said fresnell lens in the path of the positioning beam;
said first light responsive device selectively mounted on said fresnell lens; and
said second light responsive device selectively mounted at the focal point of said fresnell lens such that the positioning beam passing through the light-passing areas is incident on said second light responsive device.

12. The apparatus as set forth in claim 10 including:
a plurality of optical fiber bundles having a first end spaced a predetermined distance apart and in the path of the positioning beam and the second end of at least one bundle connected to said first responsive device to actuate said first responsive device when the positioning beam is incident on the first end of the respective bundle and the second end of the remaining optical fiber bundles connected to said second light responsive device to actuate said second light responsive device when the positioning beam is incident on the first end of the respective bundles.

13. The apparatus as set forth in claim 7 wherein said means for directing the scanning beam is on one side of a major surface of the glass ribbon to transmit the scanning beam through the glass ribbon as a transmitted scanning beam, further including:
means for mounting said defect detecting means in the path of the transmitted scanning beam.

14. The apparatus as set forth in claim 7 wherein said means for directing the scanning beam is on one side of a major surface of the glass to reflect the scanning beam from the major surface as a reflected scanning beam, further including:
means for mounting said defect detecting means in the path of the reflected scanning beam.

15. An apparatus for determining defects in a glass ribbon as a function of position in the glass ribbon wherein the glass ribbon has a first major surface and a second major surface opposite to the first major surface, comprising:
a concave specular surface mounted adjacent the first side of the glass ribbon, said concave specular surface having a first focal point adjacent the first side of the glass ribbon and a second focal point adjacent the second side of the glass ribbon;
a reflecting surface mounted at the first focal point of said specular surface;
a light intensity detector mounted at the second focal point of said specular surface;
position sensing means mounted in spaced relation to said specular surface, said position sensing means comprising:
a fresnell lens having light absorbing areas and light-passing areas spaced a predetermined distance apart along the surface of said fresnell lens;
a first response device mounted at one end of said fresnell lens said first response device activated at the start of a scan cycle; and
a second light response device selectively mounted at the focal point of said fresnell lens;
means for expanding light;
means for directing a collimated beam of light toward said expanding means to expand the beam of light into a scanning beam of light and a positioning beam of light and for transmitting the positioning beam of light and scanning beam of light onto said reflecting surface to reflect the scanning beam of light and positioning beam of light onto said concave specular surface wherein the scanning beam of light is transmitted from said specular surface through the glass ribbon incident on said light intensity detector;
means mounted in spaced relation to said specular surface and said position sensing means on the first side of the glass ribbon to reflect the positioning beam of light reflected from said specular surface to said position sensing means;
means for oscillating said reflecting surface at a predetermined constant speed to synchronously displace the positioning beam and scanning beam along said specular surface to scan a portion of the glass ribbon along a scan path and to displace the positioning beam relative to said position sensing means to indicate the start of a scan cycle and the position of the scanning beam along the scan path;
means for displacing the glass ribbon relative to the scanning beam in a direction generally transverse to the scan path to scan contiguous lateral portions of the glass ribbon; and
means acted on by said position sensing means and said light intensity detector to determine the defects in the glass ribbon as a function of position in the glass ribbon.

* * * * *